United States Patent
Hagen et al.

(10) Patent No.: US 8,645,135 B2
(45) Date of Patent: Feb. 4, 2014

(54) METHOD FOR CREATING A SPEECH MODEL

(75) Inventors: Andreas Hagen, Boulder, CO (US); Bryan Peltom, Erie, CO (US); Kadri Hacioglu, Boulder, CO (US)

(73) Assignee: Rosetta Stone, Ltd., Arlington, VA (US)

( * ) Notice: Subject to any disclaimer, the term of this patent is extended or adjusted under 35 U.S.C. 154(b) by 915 days.

(21) Appl. No.: 12/209,569

(22) Filed: Sep. 12, 2008

(65) Prior Publication Data

US 2010/0070278 A1 Mar. 18, 2010

(51) Int. Cl.
*G10L 15/06* (2013.01)

(52) U.S. Cl.
USPC .......................................................... 704/243

(58) Field of Classification Search
None
See application file for complete search history.

(56) References Cited

U.S. PATENT DOCUMENTS

| | | | |
|---|---|---|---|
| 6,151,575 A | 11/2000 | Newman | |
| 6,236,963 B1 * | 5/2001 | Naito et al. | 704/241 |
| 6,253,181 B1 * | 6/2001 | Junqua | 704/255 |
| 6,442,519 B1 * | 8/2002 | Kanevsky et al. | 704/243 |
| 6,671,666 B1 | 12/2003 | Ponting et al. | |
| 6,912,499 B1 | 6/2005 | Sabourin et al. | |
| 7,219,055 B2 | 5/2007 | Lucke | |
| 7,328,154 B2 * | 2/2008 | Mutel et al. | 704/245 |
| 7,797,158 B2 * | 9/2010 | Gilbert | 704/234 |
| 2006/0058999 A1 * | 3/2006 | Barker et al. | 704/256 |
| 2009/0094031 A1 * | 4/2009 | Tian et al. | 704/251 |

FOREIGN PATENT DOCUMENTS

| | | |
|---|---|---|
| EP | 1022722 | 7/2000 |
| JP | 2002366187 | 12/2002 |
| JP | 2003122388 | 4/2003 |
| JP | 2003255980 | 9/2003 |
| WO | WO 96/22514 | 7/1996 |
| WO | WO 02/101719 | 12/2002 |

OTHER PUBLICATIONS

Claes et al., "A Novel Feature Transformation for Vocal Tract Length Normalization in Automatic Speech Recognition", IEEE Transactions on Speech and Audio Processing, vol. 6, No. 6, Nov. 1998.*
Potamianos et al., "Robust Recognition of Children's Speech", IEEE Transactions on Speech and Audio Processing, vol. 11, No. 6, Nov. 2003.*
International Preliminary Report on Patentability, dated Mar. 24, 2011 of International Application No. PCT/US2009/56460, filed: Sep. 10, 2009.
International Search Report of International Application No. PCT/US2009/56460, filed: Sep. 10, 2009.

(Continued)

*Primary Examiner* — Brian Albertalli

(57) ABSTRACT

A transformation can be derived which would represent that processing required to convert a male speech model to a female speech model. That transformation is subjected to a predetermined modification, and the modified transformation is applied to a female speech model to produce a synthetic children's speech model. The male and female models can be expressed in terms of a vector representing key values defining each speech model and the derived transformation can be in the form of a matrix that would transform the vector of the male model to the vector of the female model. The modification to the derived matrix comprises applying an exponential p which has a value greater than zero and less than 1.

27 Claims, 4 Drawing Sheets

(56) References Cited

OTHER PUBLICATIONS

Japanese Office Action, dated Sep. 18, 2012 of Japanese Patent Application No. 2003-255980.
English translation of cited portions of Japanese Patent Application No. 2003-255980.
"Chinese Patent Application No. 200980144062.7 Office Action, as summarized by Beijing Sunhope Intellectual Property Ltd", Dec. 26, 2012, Publisher: CIPO, Published in: CN.
Decision of Rejection for Japanese Application No. 2011-526956, mailed Apr. 16, 2013.
Rabiner, L. R., "A tutorial on hidden Markov models and selected applications in speech recognition," Proceedings of the IEEE, 77(2):257-286 (1989).
Office Action for Chinese Patent Application No. 200980144062.7, dated Apr. 26, 2012.
Office Action for Chinese Patent Application No. 200980144062.7, dated Jul. 4, 2013.
Supplementary European Search Report for European Application No. 09813580, mailed Sep. 25, 2012.

* cited by examiner

METHOD FOR CREATING A SPEECH MODEL

BACKGROUND OF THE INVENTION

This patent application relates generally to speech recognition and, more particularly, to a method for creating a computerized speech model for children, making use of known speech models for adults.

Computerized voice recognition has found broad application throughout industry. One beneficial application of voice recognition has been in language learning. Specifically, a language can be learned in a much more natural way if the student actually speaks the language and his speech is monitored and criticized. A general purpose voice recognition computer program which requires little or no training is ideal for such an application. For example, a student could listen to prerecorded language being spoken by a native speaker and could attempt to duplicate the speech. The voice recognition program monitors the student's speech, accepting correct expressions and indicating whenever errors occur. The student could then try again until his pronunciation is acceptable.

Today, computerized speech models are available in many languages and could be used in the way described. That makes it possible for a student to learn a language at his own pace on a personal computer. However, the speech models tend to be for adult speech. On the other hand, language learning is particularly easy for children, and that is particularly effective time at which to learn a language. Speech models for children are not readily available and adult models do not work well for children's speech, owing to the special characteristics of that speech. Children's speech has higher pitch than even female speech and it is more variable than female speech, which is more variable than male speech.

Therefore, it would be highly desirable to be able to generate a speech recognition model for children's speech, making use of only known models for male and/or female adult speech in the same language.

SUMMARY OF THE INVENTION

The present invention concerns use of a transformation to derive a child speech model from that of an adult. A transformation is derived from male and female adult speech, the transformation being that which would have been required to convert male to female speech. In accordance with the present invention, that transformation can be subjected to a predetermined modification, and the modified transformation can be applied to a female speech model to produce an effective children's speech model. A preferred embodiment thus comprises three steps: 1) Using two adult speech models to derive a transformation representing the relationship between them, wherein the application of the transformation to the first adult speech model would substantially produce the second; 2) modifying the transformation; and 3) applying the modified transformation to the second of the two adult speech models to produce a third speech model.

In the following sections, male and female vectors are mentioned. The male and female models may comprise sets of vectors (mean vectors of the Gaussian distributions of each phoneme state). Each model may be comprised of thousands of vectors. The estimated transformation minimizes the overall mean square error between the two models when applied to all mean vectors of one model. Also other error metrics are possible, for example maximum likelihood. The transformation is applied multiple times in each model, once for each vector. This can be also seen mathematically: One mean vector has 39 dimensions, the transformation matrix is 39 dimensional. HMM based acoustic models using Gaussian distributions are shown in a tutorial on hidden Markov models and selected applications in speech recognition, Rabiner, L. R., Proceedings of the IEEE, Volume 77, Issue 2, February 1989, Pages: 257-286.

Preferably, the male and female models can be expressed in terms of a vector representing key values defining each speech model. A transformation, preferably in the form of a matrix, can then be derived which would transform the vector of the male model to the vector of the female model. In its simplest terms, the transformation is merely a multiplication of the male vector by a transformation matrix. The transformation matrix is then modified, and the modified matrix is used to transform the female vector to a synthesized children's vector. The modification to the matrix comprises applying an exponent p which has a value greater than zero and less than 1. Preferably, p is between approximately 0.25 and approximately 0.7, more preferably, between approximately 0.4 and approximately 0.5, and most preferably approximately 0.5.

BRIEF DESCRIPTION OF THE DRAWINGS

The foregoing brief description and further objects, features, and advantages of the present invention will be understood more completely from the following detailed description of a presently preferred, but nonetheless illustrative, embodiment in accordance with the present invention, with reference being had to the accompanying drawings, in which.

DETAILED DESCRIPTION OF THE PREFERRED EMBODIMENT

A "hidden Markov model" (HMM) is a statistical model in which a system being modeled is assumed to be a Markov process with unknown parameters. In using the model, hidden parameters are determined from observable parameters. The extracted model parameters can then be used to perform further analysis.

In a regular Markov model, the state of the system is directly visible to the observer, and therefore the state transition probabilities are the only parameters. In an HMM, the state is not directly visible, but variables influenced by the state are visible. Each state has a probability distribution over the possible output signals. Therefore, the sequence of output signals generated by an HMM gives some information about the sequence of states.

Figure 1:
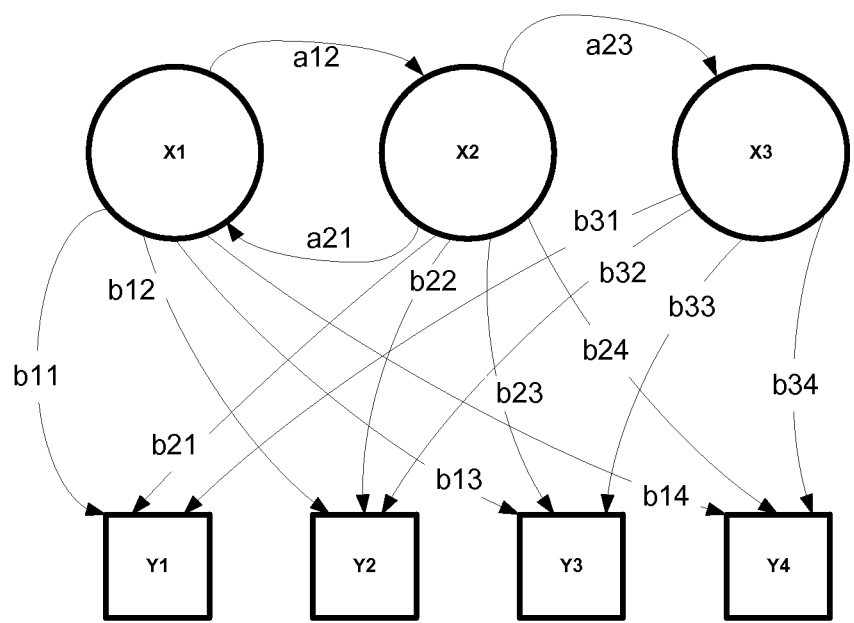
FIG. 1 is a state diagram exemplifying a hidden Markov model for a system.

For example, FIG. 1 is a state diagram of an HMM for a system. This system has 3 states X1, X2 and X3. State transition probabilities are indicated by an "a" followed by numbers representing the transition. For example, "a12" is the probability of transition from state X1 to state X2. There are also a plurality of outputs possible at each state, depending upon the sequence of states. These are indicated by "b" followed by two numbers. The blocks Y1, Y2, Y3 and Y4 represent possible observations of outputs, and from these observations, determinations can be made about the states.

In the model at hand, the parameters of interest are the HMM state mean values. A plurality of these can be grouped to define a "vector". For example, the sequence of state mean values corresponding to the male speech model can be assembled into a male model source vector m containing a component corresponding to the mean value of each state. A similar vector f can be constructed for the female speech model such as that each component of the male vector maps to a corresponding component of the female vector. It would then be possible to define a transformation T in the form of a matrix such that f=T*m, where f is the female vector and m is the male vector, and T*m is a multiplication between a matrix and a vector, a transformation of the vector.

A good estimate for the matrix T will minimize the square error between T*m and f. This can be expressed mathematically as in equation 1:

$$T = \arg\min_A (Am - f)^2 \quad (1)$$

Through the use of the equation 1, the matrix T can be found recursively. The matrix A can be initialized as the identity matrix. Each matrix entry $a_{ij}$ could then be updated by gradient descent, as shown by equation 2:

$$\frac{\partial}{\partial a_{ij}}[2(A_i m - f)m_j] \quad (2)$$

where $A_i$ is the i-th line of matrix A.

The gradient descent is run multiple times over all vector pairs (m, f) for the matrix to converge to an acceptable approximation of the transformation matrix T.

In accordance with the present invention, a synthesized children's speech model can be produced by applying a modified form of the matrix T to the female speech vector, transforming the female speech model to that of a child. The modified transformation matrix is obtained by applying a fractional exponent p to the matrix T so that the modified matrix $T'=T^p$, where p is a value greater than 0 and less than 1. Preferably p is between approximately 0.25 and approximately 0.7, more preferably between approximately 0.4 and approximately 0.5. Most preferably, p is approximately 0.5. Moreover, p is language invariant. That is, substantially the same optimum value of p should apply to all language models, regardless of the language.

Figure 4:
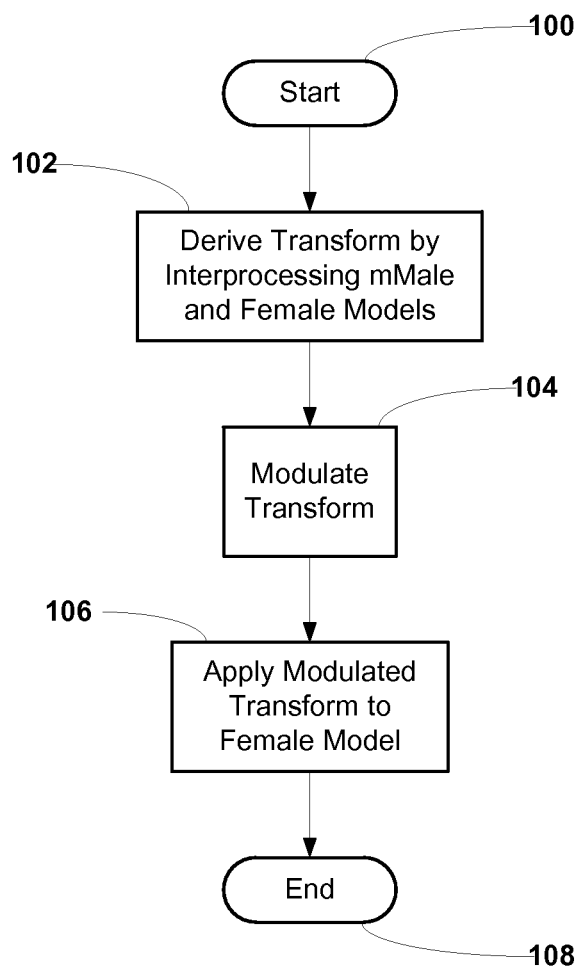
FIG. 4 depicts a short flow chart showing an embodiment of the claimed method.

The flow chart of FIG. 4 summarizes the disclosed process for producing a speech model for children. The process starts at block 100 and at block 102 an existing male speech model and an existing female speech model are inter-processed to derive a transformation that would produce the female speech model, given the male speech model. In the preferred embodiment, this was done through an iterative process that, given a vector representing the male model and a vector representing the female model, derived a transformation matrix.

At block 104, the transformation is modulated. In the preferred embodiment, this amounts to applying to the transformation matrix an exponential value between zero and one.

At block 106, the modulated transformation is applied to the female speech model, to produce a synthetic children's model, and the process ends at block 108.

Experiments

Figure 2:
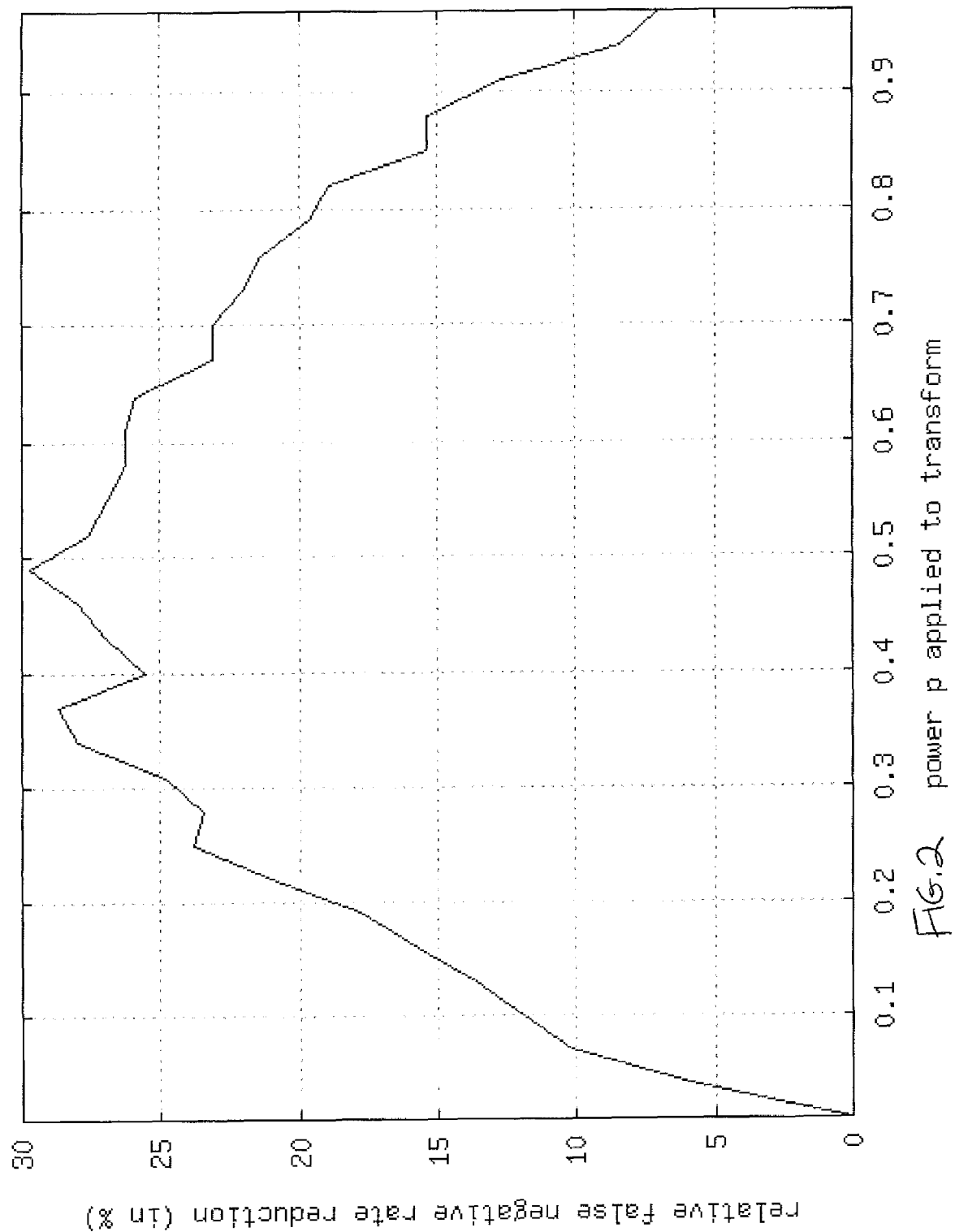
FIG. 2 is a graph illustrating the variation of the false negative rate with the value of the exponent used to create a transformation matrix for a female speech model to a children's speech model in English.

Using the process described by equations 1 and 2, a matrix T was generated with respect to existing male and female speech models in English and Spanish. A valid speech model for children was also available in each language. A transformation matrix T was generated for each language model and a series of modified transformation matrices was generated in each language using values of p between 0 and 1. Transform matrices using different values of p were then tested with actual children's speech to determine the quality of the model obtained with different values of p. FIG. 2 is a graph of relative percentage false negatives reduction for the English synthetic children's model as a function of the value of p applied to the transform. A false negative (FN) occurs when an utterance is detected as erroneous when it is actually correct.

Table 1 summarizes the results obtained for English with the male model, the female model, the synthesis children's model, and the reference children's model. This table not only shows false negatives but false accepts. A false accepts being an erroneous utterance indicated as correct.

TABLE 1

Performance of English Models

|  | Relative False Negatives Reduction Compared to Baseline | False Accepts |
|---|---|---|
| Male model | baseline | <1.0% |
| Female model | 28.1% | <1.0% |
| Synthetic model | 50.3% | <1.0% |
| Actual Children's model | 63.8% | <1.0% |

Figure 3:
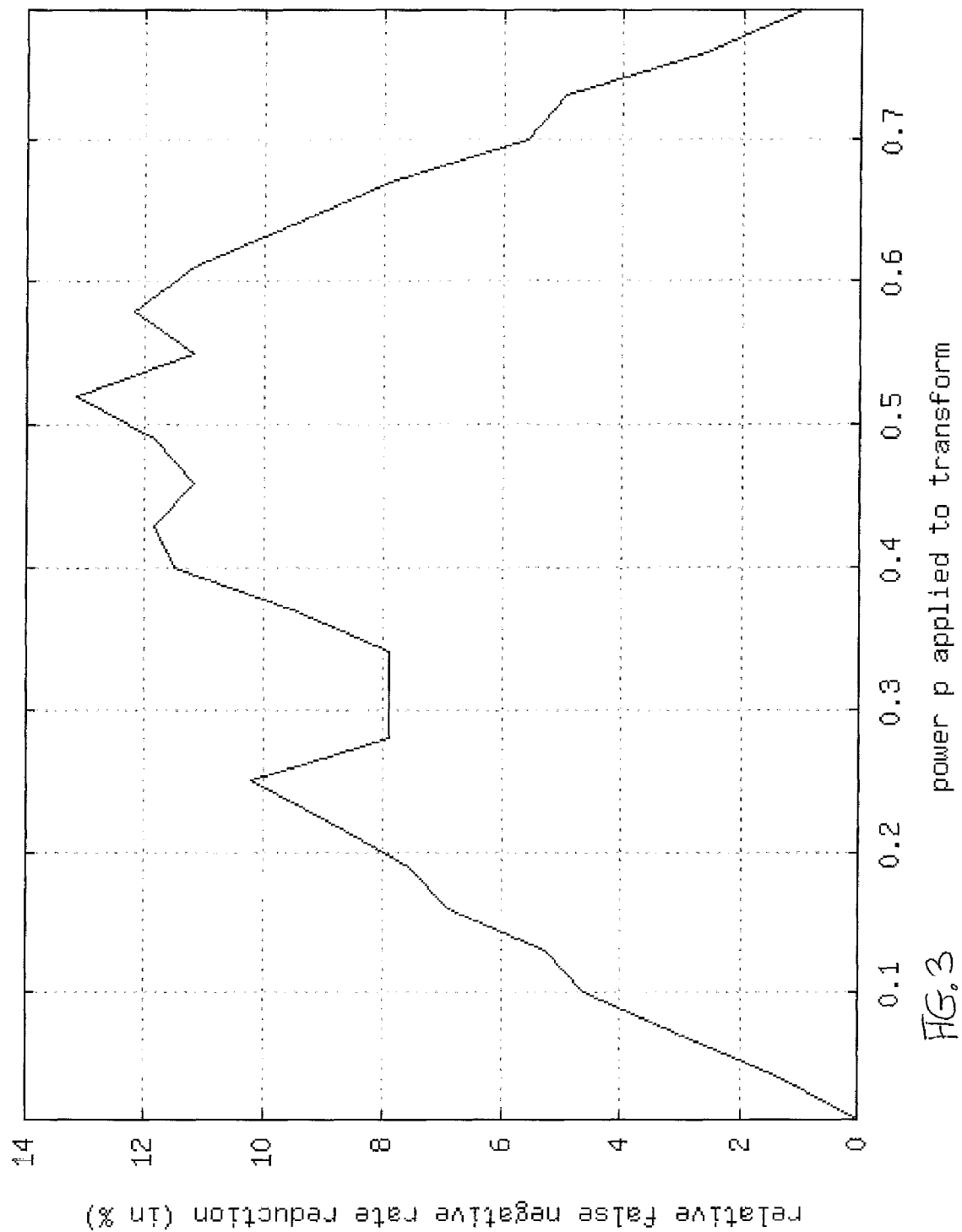
FIG. 3 depicts a graph illustrating the variation of the false negative rate with the value of the exponent used to create a transformation matrix for a female speech model to a children's speech model in Spanish.

FIG. 3 is a graph similar to FIG. 2 showing the effect of the value of p on the relative percentage of false negatives for the synthetic children's model for Spanish. Table 2 summarizes the performance of the male model, female model, synthesized children's model and references children's model in the Spanish language.

TABLE 2

Performance of Spanish Models

|  | Relative False Negatives Reduction Compared to Baseline | False Accepts |
|---|---|---|
| Male model | baseline | <1.0% |
| Female model | 45.1% | <1.0% |
| Synthetic model | 52.1% | <1.0% |
| Actual Children's model | 59.6% | <1.0% |

Children's speech is much more variable then adult speech. The variability of speech is encoded in the acoustic model covariance matrices associated with each HMM state. These covariance features are determined in the acoustic model training and reflect the variability in the underlying training set. In order to account for the variability of children's speech, covariant values were scaled.

For a multi-variate Gaussian distribution, as often applied in HMM-base acoustic models, only diagonal covariance matrices are used. These diagonal entries can be scaled in order to account for the additional variability in children's speech. The first six MFCC covariance features were scaled by the factors shown in the following grid:

| 1.40 | 1.33 | 1.27 | 1.21 | 1.15 | 1.09 |
|---|---|---|---|---|---| and the energy, delta-energy and delta-delta-energy values were scaled as shown in the following grid:

| 1.45 | 1.35 | 1.15 |
|------|------|------|

All of the other features were left unchanged. Such scaling yielded improvements in the synthetic children's models described above as examples. For the English synthetic model, false negatives were lowered to 8.1 percent with a false acceptance rate of 0.7 percent. For the Spanish synthetic children's model, the false negatives were reduced to 7.7 percent at a false acceptance rate of 0.1 percent. Since the false acceptance rate went up while the false negative rate went down, scaling has to be done carefully.

Although preferred embodiments of the invention have been disclosed for illustrative purposes, those skilled in the art will appreciate that many additions, modifications, and substitutions are possible without departing from the scope and spirit of the invention as defined by the accompanying claims.

What is claimed:

1. A computerized method for generating a speech model for a third speech group comprising the steps of:
   deriving, with a computer, a transformation that would produce an existing second speech group model when operating on an existing first speech group model; and
   applying, with a computer, the transformation to the second speech group model to produce a model for the third speech group,
   wherein the first speech group constitutes adult males, the second speech group constitutes adult females, and the third speech group constitutes children, and wherein the model for the third speech group is used to recognize, with a computer, speech from members of said third group.

2. The method of claim 1 wherein the transformation is subjected to modification prior to the applying step.

3. The method of claim 2 wherein the modification comprises applying an exponential operation to the transformation.

4. The method of claim 3 wherein the exponential operation is done with an exponential value between zero and one.

5. The method of claim 4 wherein the exponential operation is done with an exponential value between approximately 0.25 and approximately 0.7.

6. The method of claim 4 wherein the exponential operation is done with an exponential value between approximately 0.4 and approximately 0.5.

7. The method of claim 4 wherein the exponential operation is done with an exponential value of approximately 0.5.

8. The method of claim 1 wherein the children's speech group model includes covariant values associated with its states and the covariant values are scaled to account for variability in children's speech.

9. The method of claim 8 wherein the covariance values are in the form of a diagonal matrix and the first six covariant features are scaled as follows:

| 1.40 | 1.33 | 1.27 | 1.21 | 1.15 | 1.09 |
|------|------|------|------|------|------| and energy, delta-energy and delta-delta-energy values are scaled as follows:

| 1.45 | 1.35 | 1.15. |
|------|------|-------|

10. The method of claim 1 wherein the male and female speech models are represented as vectors of values representing states in a statistically modeled system, the transformation being a matrix that would transform the male vectors into the female vectors.

11. The method of claim 10 wherein the matrix is subjected to an exponential operation.

12. The method of claim 11 wherein the exponential operation is done with an exponential value between zero and one.

13. The method of claim 11 wherein the exponential operation is done with an exponential value between approximately 0.25 and approximately 0.7.

14. The method of claim 11 wherein the exponential operation is done with an exponential value between approximately 0.4 and approximately 0.5.

15. The method of claim 11 wherein the exponential operation is done with an exponential value of approximately 0.5.

16. The method of claim 10 wherein the children's speech group model includes covariance values associated with its states and the covariant values are scaled to account for variability in children's speech.

17. The method of claim 16 wherein the covariant values are in the form of a diagonal matrix and the first six covariant features are scaled as follows:

| 1.40 | 1.33 | 1.27 | 1.21 | 1.15 | 1.09 |
|------|------|------|------|------|------| and energy, delta-energy and delta-delta-energy values are scaled as follows:

| 1.45 | 1.35 | 1.15. |
|------|------|-------|

18. The method of claim 1 wherein the transformation is subjected to modulation prior to the applying step.

19. The method of claim 18 wherein the modulation comprises applying an exponential operation to the transformation.

20. The method of claim 19 wherein the exponential operation is done with an exponential value between zero and one.

21. The method of claim 19 wherein the exponential operation is done with an exponential value between approximately 0.25 and approximately 0.7.

22. The method of claim 19 wherein the exponential operation is done with an exponential value between approximately 0.4 and approximately 0.5.

23. The method of claim 19 wherein the exponential operation is done with an exponential value of approximately 0.5.

24. The method of claim 1 wherein the third speech group model includes covariant values associated with its states and the covariant values are scaled to account for variability in speech being modeled.

25. A method comprising deriving, with a computer, a transformation function from a set of models of speech from first and second population types which differ from one another, and using the derived transformation function, with a computer, to transform a speech model from one of said first and second population types to a third population type, said third population type being different from both of said first and said second population types, and recognizing, with a computer, speech from individuals in said third population type using said derived speech model.

26. The method of claim 25 wherein said first and second population types are male and female adults, respectively, and said third population type is children.

27. The method of claim 25 wherein after said transformation to said third population type, said speech is used to train someone in a new language.

* * * * *

UNITED STATES PATENT AND TRADEMARK OFFICE
CERTIFICATE OF CORRECTION

PATENT NO. : 8,645,135 B2  Page 1 of 1
APPLICATION NO. : 12/209569
DATED : February 4, 2014
INVENTOR(S) : Andreas Hagen It is certified that error appears in the above-identified patent and that said Letters Patent is hereby corrected as shown below:

Title Page: Item (75)    Inventors (line 2):    Change "Peltom" to --Pellom--

Signed and Sealed this
Seventeenth Day of March, 2015

Michelle K. Lee
*Director of the United States Patent and Trademark Office*